Sept. 29, 1925.

N. MILLER

FOCUSING DEVICE

Filed July 9, 1923

Inventor
Nicholas Miller

Sept. 29, 1925.  N. MILLER  1,555,142
FOCUSING DEVICE
Filed July 9, 1923    2 Sheets-Sheet 2

Inventor
Nicholas Miller

Patented Sept. 29, 1925.

1,555,142

UNITED STATES PATENT OFFICE.

NICHOLAS MILLER, OF HARTFORD, CONNECTICUT.

FOCUSING DEVICE.

Application filed July 9, 1923. Serial No. 650,282.

*To all whom it may concern:*

Be it known that I, NICHOLAS MILLER, a citizen of the United States of America, and a resident of Hartford, county of Hartford, and State of Connecticut, have invented certain new and useful Improvements in a Focusing Device, of which the following is a specification.

This invention relates to a focusing device for cameras, and consists of a simple and efficient optical arrangement combined with the camera, whereby the objective can be brought into proper focus for objects at various distances from the camera. One of the objects of the invention is to combine an optical range finding device with the camera in such a way as to require but slight modifications in the design or structure of the present type of folding cameras. In focusing cameras it has been proposed to connect the optical range finding system to the focusing mechanism of the shiftable objective, and this requires a mechanism known as the "rack and pinion" focusing movement, which is found only on the more expensive cameras, whereas the present invention is particularly well adapted to cameras having the more usual and less expensive focusing movements. As the conventional forms of folding cameras are constructed in a very compact manner, it is necessary that the optical range finding system be of limited dimensions, if extensive changes in the structure of the camera are to be avoided. For the purposes of this invention I prefer to use the basic arrangement of the range finding device disclosed in my pending application filed Nov. 21, 1921, Ser. No. 516,755, for the optical system therein disclosed is, in view of its compactness and efficiency, especially well adapted for the purposes of this invention. As it will appear from the description which follows, this range finding system as applied to the camera is of a comparatively long "base line" and therefore considerably greater precision in focusing is attainable than in other devices which have been proposed for this purpose.

As is well known, photographic objectives vary somewhat in actual focal lengths from their nominal focal lengths due to the variations in the materials and the processes of manufacturing. This condition requires therefore that the optical range finding system be adjusted to the individual objectives of each camera if accurate focusing is to be attained.

In the present invention independent adjustments are provided whereby the range finding device may be calibrated to precisely correspond to three different focal distances of the objective. Inasmuch as certain of the principles and part of the structure of the optical range finding system does not form a part of the claims of this application, a detailed description of same is omitted, and for such a description reference is to be had to my aforesaid pending application.

The principle of this instrument depends upon the formation of two simultaneous optical images of an object viewed and the means for moving one of said images into alignment with the other, by moving one of the image forming reflectors or optical elements, and the present invention is concerned more particularly with the means for establishing a correlation between the focal distances of the objective corresponding to objects at various distances, and the movement of said optical element.

Figure 4:
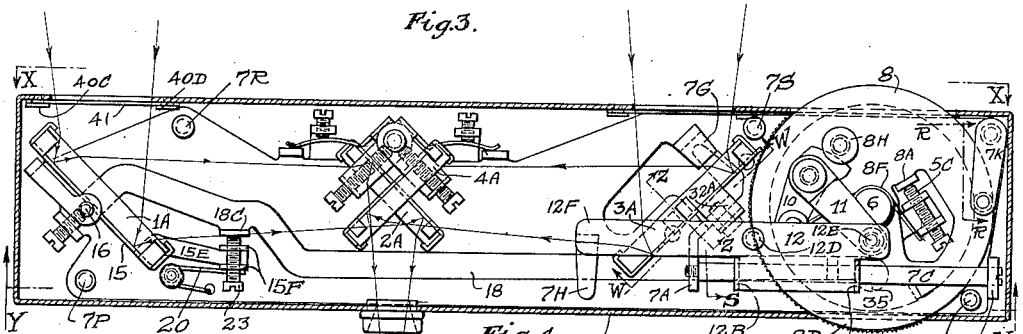
Fig. 4 is a top view of the range finding device with the casing shown in section.
Figure 5:
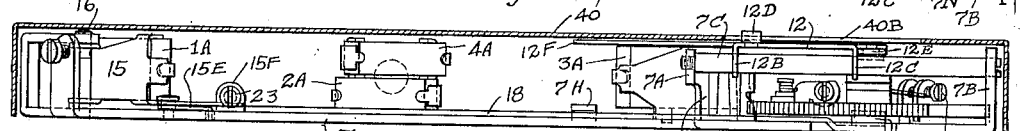
Fig. 5 is a sectional side view in the direction " YY " Fig. 4.

In Figs. 4 and 5 the four reflectors $1^A$, $2^A$, $3^A$ and $4^A$ are similar in their arrangement with the four reflectors disclosed in the aforesaid pending application. Reflector $1^A$ is the pivotally supported reflector and is adapted to be moved about its pivot 16 by the lever arm 18. Lever 18 is provided at its end with a roller 35 Figs. 4, 5, 8, 9, said roller cooperating with a cam 5 which is rotatably supported by a stud 6 upon the base plate 7. The reflector holder 15 for the reflector $1^A$ is provided with an extension $15^E$, having two upward projections $15^F$ for the set screw 23, which bears on the upwardly bent lip $18^C$ of the lever 18. A spring 20 anchored to the base 7 holds the reflector holder 15 in an adjusted relation to the lever 18 and likewise holds the roller 35 in contact with the cam 5. The pair of reflectors $1^A$ and $2^A$ form one of the virtual images of an object and the reflector pair $3^A$ and $4^A$ form the other virtual image. The virtual image by the reflectors $1^A$ and $2^A$ is caused to travel toward the other virtual image by the rotation of reflector $1^A$ about its pivot, and the extent of this rotation when the images are in alignment varies according to the distance of the object. The conditions for the proper cooperation of reflectors $1^A$ and $2^A$ and for $3^A$ and $4^A$, as well as the structure of the reflector supports for the reflectors $1^A$, $2^A$ and $4^A$ are similar to that disclosed in my aforementioned pending application, while the adjustment provided for the reflector $3^A$ is somewhat different and will hereinafter be described. The mechanism for correlating the rotational movement of reflector $1^A$ with that of the movement of the objective will now be described.

Figure 1:
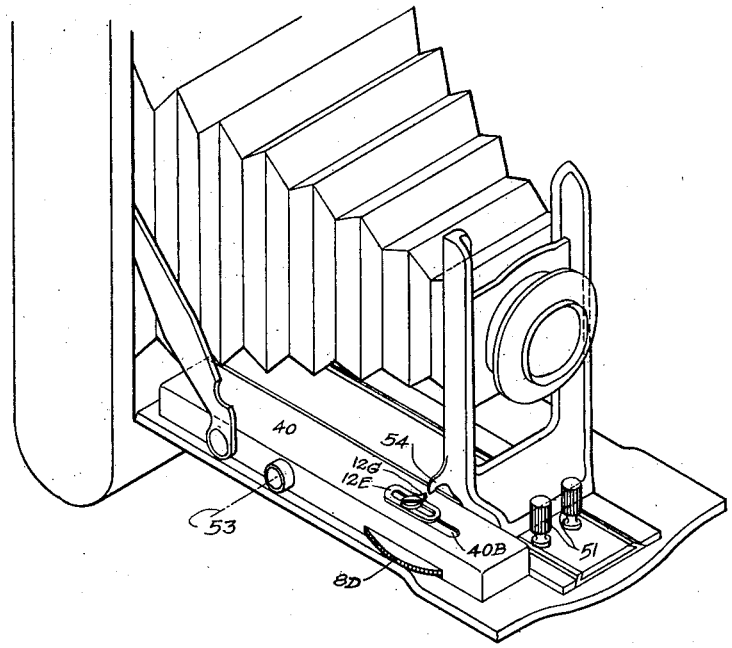
Fig. 1 is an isometric view showing the invention as applied to a conventional type of folding camera.
Figure 2:
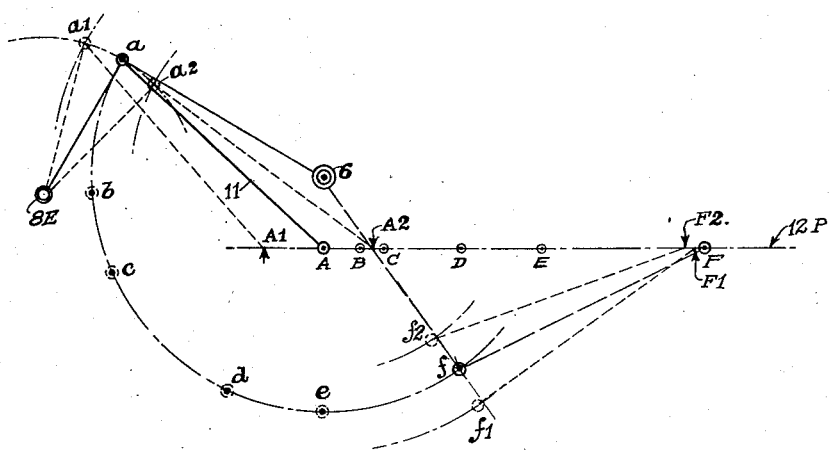
Fig. 2 is a partial and enlarged diagrammatic view of the focusing mechanism.
Figures 8, 10:
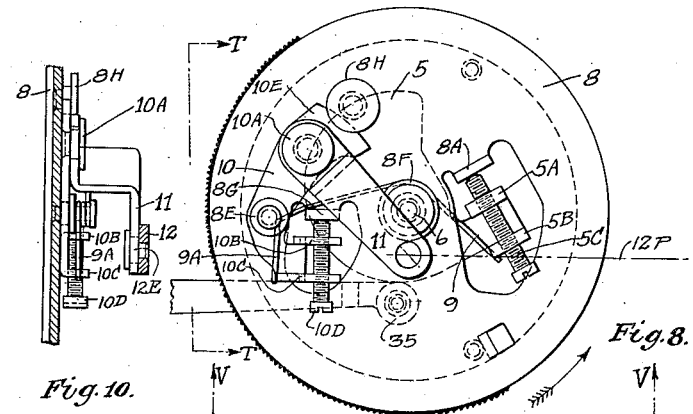
Fig. 8 is an enlarged top view of the focusing mechanism.
Fig. 10 is a view of Fig. 8 in the direction " TT."
Figure 11:
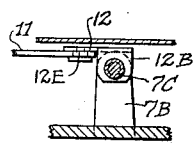
Fig. 11 is a partial sectional view in the direction " S," Fig. 4.
Figure 9:
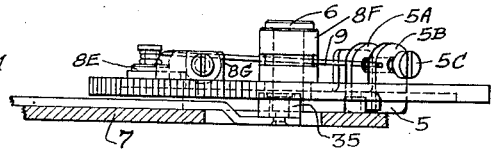
Fig. 9 is a view of Fig. 8 in the direction " VV."

Cam 5 Figs. 4, 5, 8, and 9 is provided with two parallel upward projections $5^A$ and $5^B$ for receiving the adjusting screw $5^C$, the end of said screw bearing against an upwardly projecting lip $8^A$ of a disc 8, which is provided with a hub $8^F$ and is likewise rotatably supported on stud 6. A spring 9 holds the screw $5^C$ in contact with the lip $8^A$. The outer circumference of the disc 8 projects partially through the casing 40 as shown at $8^D$ Fig. 4, and the circumference of said disc is partially roughened or knurled for facilitating the rotation of said disc by the fingers. Upon disc 8 a lever 10 is pivotally supported by a stud $8^E$ Figs. 4, 5, 8 and 9, and upon this lever a link 11 is pivotally supported at $10^A$; this link is suitably offset as shown in Fig. 10 so that it may clear the top of the hub $8^F$ and stud 6. The other end of the link 11 is pivotally connected to a member 12, (Figs. 4, 5, 10 and 11) said member being provided with two parallel downward projections $12^B$ and $12^C$, and with perforations to receive the fixed rod $7^C$ to be slidingly supported thereby. Rod $7^C$ is supported by upright projections $7^A$ and $7^B$ of the base plate 7. Lever 10 Figs. 8, 9 and 10 is provided with two upright extensions $10^B$ and $10^C$ for the adjusting screw $10^D$, the end of said screw bearing against an upward lip $8^G$ of the disc 8, through the action of the spring end $9^A$ which is anchored around the stud $8^E$ and hub $8^F$ and is a continuation of spring end 9. A shouldered stud $8^H$ guides the extended portion $10^E$ of the lever 10 in contact with the upper surface of the disc 8. Thus it will be seen that the cam 5 and pivotal stud $10^A$ are held by the spring ends 9 and $9^A$ in a definite relation with respect to the disc 8 and it will further be apparent that the rotation of the disc 8 will cause a rocking motion of the reflector 1 and simultaneously a sliding movement of member 12. The rocking of the reflector $1^A$ about its pivot will bring the virtual images of an object at various distances into alignment and if the increments of the sliding movement of member 12 corresponding to these various distances should be equal to the increments of the focal distances of the objective for the same distances, then this sliding movement may be made to indicate the precise position of the objective for an object whose virtual images are in alignment. I have found that if the path $12^F$ of the slide 12 Fig. 8 is suitably chosen with respect to the position and length of the link 11, then for a predetermined nominal focal length, a smooth and continuous curve will result for the cam 5. Member 12 Figs. 4 and 5, is provided with a stud $12^D$ projecting through a slot $40^B$ in the casing 40 and said stud is threaded for a screw by which a slotted indicator $12^E$ is fastened to the stud $12^D$ as shown in Fig. 1, and the point $12^G$ of the indicator can be adjusted longitudinally by means of said slot. As shown in Fig. 1 the range finding device is fastened on the hinged or folding door of the camera and in such a way that when the objective is in focus for a distant object, the rays are free to enter the apertures $47^A$ and $47^B$ (Fig. 3) of the range finder, under the bellows and inside the objective support. The knurled portion $8^D$ is near the edge of the door of the camera and accessible to the fingers. In using the camera, the objective support is drawn out on its track by means of the knurled finger pieces 51 provided for that purpose, to a position in focus for a distant object, and in this position of the objective support the rays from an object have a clear access to the reflectors 1^A and 3^A if the camera is held so that the object is in line with the axis of vision 53; in this position the two optical images may be brought into alignment by the manipulation of the knurled disc 8^D, and simultaneously the indicator point 12^G will move toward the right to an extent corresponding to the focal distance of the objective for the object to be photographed. The objective support is now moved with its pointer 54 opposite the indicator point 12^G and then the objective will be in precise focus for the object. By arranging the range finder longitudinally on the folding door, a comparatively long "base" instrument (relative to the focal length of the objective) can be used which increases the precision of the focusing, and furthermore this arrangement requires but slight alterations in the conventional type of folding cameras. As has before been stated, if accurate focusing is to be attained, the range finder has to be calibrated to each individual objective of a camera. In the present invention means are provided for expeditiously making such adjustments. The curvature of the cam 5 is designed for an objective of a predetermined nominal focal length and the actual focal lengths will vary somewhat from this nominal or ideal focal length. As the focal length increases or decreases, the increments of the focal distances (corresponding to objects at various distances) will likewise increase or decrease. In Fig. 2, 6 represents the axis of the disc 8 (Fig. 8), $a$ the pivotal connection 10^A, A the pivotal connection 12^E of the other end of the link 11, and 12^P represents the path of 12^E upon the slide 12. If A, B, C, D, E, F represent points corresponding to various focal distances of an objective of a predetermined nominal focal length, then $a$, $b$, $c$, $d$, $e$, and $f$ represent the corresponding points of $a$ on the circumference about center 6, and the pivotal points $a$—A of link 11 correspond to a distant object (say 100 ft.) and the points $f$—F to a near object (say 6 ft.), while the points B, C, D, E correspond to intermediate distances. From this diagram it will appear that to a uniform rotational movement about axis 6, there corresponds a variable sliding movement on the line 12^P, and further that this variation increases as the point $a$ advances from its initial position as will be apparent by comparing the increments $bc$ and $de$ with their corresponding increments BC and DE. It has been explained in connection with Figs. 8 and 10 that lever 10 is adjustable relative to disc 8 by means of the screw 10^D and thereby the pivot 10^A may be shifted toward or away from the axis 6 of disc 8, and in Fig. 2 $a^1$ and $a^2$ represent such positions of the pivot 10^A. In position $a^1$ the link 11 will assume position $a^1$—A$^1$, for a distant object, and position $f^1$—F$^1$ for a near object, and since the distance A$^1$—F$^1$ is greater than the distance A—F the position $a^1$ will correspond to an objective having a focal length somewhat in excess of the nominal focal length, and the range finding device may be adjusted precisely for two focal distances of this objective, corresponding to A$^1$ and F$^1$. This is accomplished in the following manner: The disc 8 is turned to its initial or "long distance" position shown in Fig. 8, and the reflector 1^A (Figs. 4 and 5) is adjusted by screw 23 until the two virtual images of an object at such a distance are in alignment; the disc 8 is now rotated in the direction of the arrow to its other limiting position at which point the reflector 1^A (Figs. 4 and 5) is rocked by the cam 5 just enough to bring the virtual images of an object corresponding to the position of the objective F$^1$ into alignment. The curvature of the cam follows a definite mathematical law depending both on the focal length of an objective, of a predetermined focal length, and the movement of the reflector 1^A, and for slight variations of the focal length the adjustment of the pivot $a$ will modify the increments of the focal distances with sufficient precision for most purposes.

However, for greater variations in the focal lengths of the objective or if greater precision is required the range finder can be calibrated to precisely correspond to three focal distances of the objective. It has been shown that a two point correspondence can be precisely obtained by adjusting the position of the pivot $a$, and it will now be shown that an exact correspondence can be established for another intermediate point such as D, by adjusting the position of the cam 5 about the axis of disc 8, by the screw 5^C. First a two point correspondence is established as for points A$^1$ and F$^1$ as already explained, and then the correspondence is observed for the other intermediate point D and if this correspondence is not sufficiently precise, cam 5 is shifted into a different position by the screw 5^C, bringing a different portion of the cam curve to act upon the reflector 1^A, and for this new position of the cam a two point correspondence is anew established for the extreme positions of the disc 8, by adjusting the reflector 1^A with the screw 23 and the position of pivot $a$ just as before. Now the correspondence for the intermediate focal point D is again tested which will be different from the first trial, and if not sufficiently precise, the process is repeated, until a sufficiently precise correspondence for the three points is obtained.

In Fig. 2 the position of the initial point A and consequently the position of slide 12 varies with each adjustment of the pivot a and this is compensated for by the adjustment of the indicator point 12$^G$ (Fig. 1) with the corresponding position of the pointer 54 of the objective support. Slide 12 Figs. 4 and 5 has an extension 12$^F$ for the purpose of covering the slot 40$^B$ in its advanced position.

Figure 6:
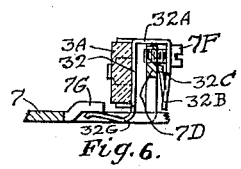
Fig. 6 is a sectional view of the reflector 3^A and its holder along line " ZZ " Fig. 4.
Figure 7:
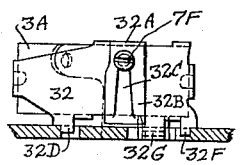
Fig. 7 is a partial rear view of the reflector 3^A and its holder along the line " WW " Fig. 4.

The reflector 3$^A$ is tilted relative to the base 7 as explained in my aforementioned pending application, but the structure provided for this purpose is somewhat different in the present invention. In Figs 4, 6 and 7 the reflector holder 32 is provided with a bent portion 32$^A$ which straddles the upward projection 7$^D$ of the base 7, and the downward extension 32$^B$ is sheared in, forming a spring 32$^C$, which bears against the upward projection 7$^D$; a screw 7$^F$ threads into the upper end of 7$^D$ and it holds the reflector holder against the tension of the spring end 32$^C$. In Fig. 7 the reflector holder is provided with two projections 32$^D$ and 32$^F$, fitting into slots in the base 7. Thus by the screw 7$^F$ the reflector 3$^A$ may be tilted relative to the base 7. A downward spring extension 32$^G$ bearing against a lip 7$^G$ holds the reflector against the base 7. 7$^H$ (Figs. 4 and 5) is a lip sheared upward from the base 7 for guiding lever 18 in contact with the base 7.

Figure 3:
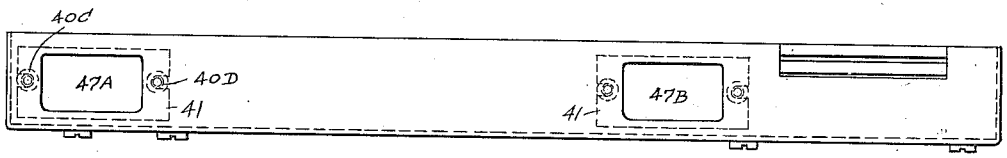
Fig. 3 is an outside side view of the range finding device in the direction " *xx* " Fig. 4.
Figure 12:
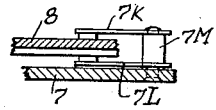
Fig. 12 is a partial sectional view of the friction spring device in the direction " RR " Fig. 4.

It is desirable to have some frictional resistance on the disc 8, and such is provided by the springs 7$^K$ and 7$^L$, Figs. 4 and 12, riveted to the base by a stud 7$^M$ and said springs straddle the edge of the disc 8 thereby producing a balanced friction on same. The casing 40 is fastened to the base through the four studs 7$^N$, 7$^P$, 7$^R$ and 7$^S$, Fig. 4. The apertures 47$^A$ and 47$^B$, Figs. 3 and 4, are preferably covered with transparent celluloid, to keep dust and dirt from the reflectors; shouldered studs 40$^C$ and 40$^D$ are riveted inside the casing and on opposite sides of the apertures, and a piece of celluloid provided with opposite slots to fit said shoulder studs are bent and allowed to "spring" into position as shown and are retained by said shouldered studs.

The usual focusing scale may be provided for the camera, to obviate the necessity of focusing for objects at known distances.

I claim:

1. The combination with a camera having an adjustable objective, of two pairs of cooperating reflectors for simultaneously forming two visible images of an object, one of said reflectors being mounted for a rocking movement and adapted to move one of the images into alignment with the other image; a lever arm connected to said reflector and a cam element for rocking said lever arm; an indicator mounted for sliding motion, connection between the cam element and the indicator, whereby the increments of the movements of the indicator, correspond to the increments of the focal distances of the objective, when the images of objects at various distances are in alignment, and means for manually adjusting the objective relative to said indicator.

2. In combination with a camera having an adjustable objective, of two pairs of cooperating reflectors for simultaneously forming two virtual images of an object, means for moving one of said reflectors for bringing the virtual images into alignment; an indicator, means for moving said indicator simultaneously with the reflector, the increments of the movements of said indicator corresponding to the increments of the focal distances of an objective of a predetermined focal length, when said images are in alignment; adjustable means for varying the movement of said indicator for precisely correlating two different positions of said indicator to two different focal distances of the objective, and provision for manually aligning the objective with said indicator.

3. In combination with a camera, an objective, an optical system comprising a pivoted reflector; a disc mounted for rotary motion about a fixed axis and means for rocking the reflector by the operation of said disc; a member adapted to move in a path which is substantially parallel to the axis of the objective, a link connecting the disc and said member, whereby a uniform rotary motion of the disc produces a variable motion of said member, and means for adjusting the focal distance of the camera to correspond to the position of said member.

4. In combination with a camera, an objective, an optical system, a pivotally supported reflector cooperating with said optical system, a lever arm for said reflector, and means for adjusting the lever arm relative to said reflector; a rotatably mounted cam cooperating with said lever arm, and means for manually actuating said cam; a sliding member, a link operatively connecting the cam with said sliding member and means for positioning the objective with respect to the sliding member.

5. In combination with a camera having an adjustable objective, a movable reflector, a disc pivotally mounted and adapted to be rotated by the hand; a cam element adjustably mounted on said disc and means for moving the reflector by said cam; a member for indicating the focal distances of the objective, a link operatively connecting the disc and said member, and means for adjusting said link for varying the movements of said member.

6. In combination with a folding camera having an adjustable objective; an optical range finder secured longitudinally on the folding door of said camera; two spaced apertures having an unobstructed path to receive light rays from an object when the objective is in position for a distant object; an indicator for indicating the focal distances of the objective and means for manually positioning the objective with respect to said indicator.

7. In combination with a camera having an adjustable objective, a movable reflector, a disc pivotally mounted and adapted to be rotated by the hand, and means for moving the reflector by said disc; a member operatively connected to said disc, for indicating the focal distances of the objective, and a friction device acting on said disc for frictionally holding it in position.

8. In combination with a camera comprising an adjustable objective, two pairs of cooperating reflectors for simultaneously forming two visible images of an object, means for moving one of the reflectors for shifting one of the images into alignment with the other image; an indicator, connection between the indicator and said reflector whereby the increments of the movements of the indicator correspond to the increments of the focal distances of the objective when the images are in alignment, and provision for manually positioning the objective relative to said indicator.

9. In combination with a camera, an objective, an optical system for simultaneously forming two virtual images of an object, a pivoted reflector adapted to bring one of the images into alignment with the other image; a lever arm connected to said reflector and means for adjusting the angular relation of the reflector with respect to said lever arm; a cam adapted for rotation about a fixed axis and cooperating with said lever arm; means for adjusting the initial position of the cam about its axis, and provision for manually rotating said cam; a sliding member, a link connecting the cam and said sliding member and means for adjusting the focal distance of the objective relative to said sliding member.

10. In combination with a camera provided with an adjustable objective, two pairs of cooperating reflectors for simultaneously forming two virtual images of an object, one of said reflectors being adapted for a rocking movement for moving one of the virtual images into alignment with the other images; an indicator, operative connection between the indicator and said rocking reflector, whereby the increments of the movements of the indicator correspond to the increments of the focal distances of the objective when the virtual images are in alignment, and provision for manually positioning the objective relative to said indicator.

11. The combination with a camera having an adjustable objective, of two pairs of cooperating reflectors for simultaneously forming two visible images of an object, one of said reflectors being mounted for pivotal motion, and adapted for shifting one of the images into alignment with the other image; a movable indicator, connection between the indicator and said reflector whereby the increments of the movements of the indicator correspond to the increments of the focal distances of an objective of a predetermined focal length, when the images are in alignment, and provision for adjusting the movement of said indicator to precisely correspond to two different focal distances of the adjustable objective and means for manually positioning the objective relative to said indicator.

12. The combination with a camera having an adjustable objective, of two pairs of cooperating reflectors for simultaneously forming two visible images of an object, means for moving one of said reflectors for shifting one of the images into alignment with the other image; an indicator, connection between the indicator and said reflector whereby the increments of the movements of the indicator correspond to the increments of the focal distances of an objective of a predetermined focal length, means for adjusting the movement of said indicator, another independent adjustment for varying the movement of said reflector, and means for manually positioning the objective relative to said indicator.

13. In combination with a camera, an objective, two pairs of cooperating reflectors, one of the reflectors being pivotally movable about a fixed axis; a cam mounted for rotational motion and cooperating with said reflector; a member movable in a path which is substantially parallel to the axis of the objective; a link for transmitting motion from the cam to said member, an indicator fastened to said member and means for adjusting the position of the indicator on said member.

14. In combination with a camera provided with an adjustable objective, an optical system comprising a movable reflector; a cam movable about a fixed axis cooperating with said reflector, and means for adjusting the initial position of said cam; a member adapted to move in a plane substantially parallel to the axis of the objective; a link connection between the cam and said member and means for adjusting one of the connections of said link; an indicator, means for adjustably securing the indicator to said member, and provision for manually positioning the objective relative to said indicator.

15. In combination with a camera an objective, an optical system comprising a movable reflector; a disc mounted for rotational motion and adapted to be manipulated by the fingers; a cam secured to said disc and cooperating with said movable reflector, and means for adjusting the position of the cam upon said disc; a movable member adapted to indicate the focal distances of the objective; a link pivotally connected to the movable member and to the disc, means for adjusting the position of the pivot of the link on said disc, and provision for adjusting the focal distances of the objective according to the position of said movable member.

NICHOLAS MILLER.